United States Patent
Hashimoto

(10) Patent No.: US 6,924,955 B2
(45) Date of Patent: Aug. 2, 2005

(54) READ/WRITE DEVICE FOR CARTRIDGE MEMORY

(75) Inventor: Akihiro Hashimoto, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 61 days.

(21) Appl. No.: 10/691,523

(22) Filed: Oct. 24, 2003

(65) Prior Publication Data

US 2004/0080853 A1 Apr. 29, 2004

(30) Foreign Application Priority Data

Oct. 29, 2002 (JP) ........................................ 2002-314525

(51) Int. Cl.$^7$ ........................... G11B 19/02; B65H 19/28
(52) U.S. Cl. ...................... 360/69; 242/532.1; 700/117; 369/258
(58) Field of Search ............................... 360/31, 69, 55, 360/15, 61, 132; 242/532.1, 534, 324, 335, 341, 345.1; 369/258, 259, 30.28, 30.03, 30.27; 700/95, 117

(56) References Cited

U.S. PATENT DOCUMENTS

| | | | | |
|---|---|---|---|---|
| 5,148,403 A | * | 9/1992 | Gardner | 366/15 |
| 5,513,818 A | * | 5/1996 | Wada et al. | 242/532.1 |

FOREIGN PATENT DOCUMENTS

JP          02001337753 A     * 12/2001

* cited by examiner

Primary Examiner—Andrew L. Sniezek
(74) Attorney, Agent, or Firm—Sughrue Mion, PLLC

(57) ABSTRACT

An object of the present invention is to provide a cartridge memory read/write device which can write data signals in plural kinds of cartridge memories. The cartridge memory read/write device is used in a production line on which the plural kinds of cartridge memories flow, and is characterized by being equipped with plural kinds of read/write units reading and writing data signals corresponding to respective kinds of plural kinds of cartridge memories and a control unit selecting a read/write unit corresponding to kinds of cartridge memories which flow on the production line out of the plural kinds of read/write units.

20 Claims, 2 Drawing Sheets

READ/WRITE DEVICE FOR CARTRIDGE MEMORY

FIELD OF THE INVENTION

The present invention relates to a cartridge memory read/write device reading/writing data signals of a cartridge memory built in a magnetic tape cartridge, and in more particular, relates to the cartridge memory read/write device which can write data signals in plural kinds of cartridge memories.

BACKGROUND OF THE INVENTION

Generally, in a magnetic tape cartridge used as a recording medium for backup of a computer is built a cartridge memory of a non-contact recording medium, in which data signals such as manufacture/management information are designed to be able to be written. Meanwhile, as the management information, for example, there exist data position information, media usage histories, error logs, and the like.

A timing when the data signals are written in the cartridge memory differs according to a difference of manufacturing processes of the magnetic tape cartridge. For example, as for a process winding a magnetic tape on a tape reel of the magnetic tape cartridge, following forms exist and corresponding to respective forms, timings to write the manufacture/management information and the like in the cartridge memories differs, respectively.

Firstly, there exists a form winding a magnetic tape supplied from so called a pancake on a tape reel prior to being built in a magnetic tape cartridge. In a final process of assembling the magnetic tape cartridge, the form builds the tape reel, in which the magnetic tape is already wound in a cartridge case, and a cartridge memory. Therefore, writing data signals into the cartridge memory is after the final process of assembling the magnetic tape cartridge, so writing the data signals is performed by one cartridge memory read/write device (for example, see Japan patent laid open publication 2001-237639).

Secondary, there exists another form winding a magnetic tape on a tape reel already built in a magnetic tape cartridge. The form arranges a plurality of tape winders in a production line and winds the magnetic tape on the tape reel of each magnetic tape cartridge by each tape winder. Therefore, writing data signals into a cartridge memory is performed by a cartridge memory read/write device installed at each winder when the magnetic tape is wound on the tape reel by each winder.

By the way, in these years, cartridge memories are variously manufactured in their kinds as their performance is improved, so when writing data signals in the cartridge memories, writing as well as reading are not possible unless using an exclusive cartridge memory read/write device corresponding to respective kinds. Therefore, in any of the above forms, every time when writing the data signals in different kinds of cartridge memories, it is necessary to change to cartridge memory read/write devices corresponding to the respective kinds.

However, if the cartridge memory read/write device is changed each time to write data signals in plural kinds of cartridge memories, a production line has to be stopped during changing, thereby a problem of productivity going down existing. In particular, when the cartridge memory read/write device is installed at each tape reel winder, every cartridge memory read/write device has to be changed, thereby the productivity remarkably going down.

SUMMARY OF THE INVENTION

An exemplary object of the present invention is to provide a cartridge memory read/write device which can write data signals in plural kinds of cartridge memories.

A cartridge memory read/write device of the invention is the device used in a production line where plural kinds of cartridge memories flow and is characterized by being equipped with plural kinds of read/write units reading/writing data signals corresponding to respective kinds of plural kinds of cartridge memories and a control unit selecting a read/write unit corresponding to kinds of cartridge memories flowing on the production line.

The cartridge memory read/write device of the invention enables, in writing the data signals in a cartridge memory, one cartridge memory read/write device to handle the plural kinds of cartridge memories by selecting a read/write unit corresponding to kinds of cartridge memories flowing on the production line out of the plural kinds of read/write units. Accordingly, because a change to a cartridge memory read/write device corresponding to the kinds of cartridge memories is not needed each time, productivity can be improved.

Another cartridge memory read/write device of the invention is the device used in a tape winder winding a magnetic tape on a tape reel and is characterized by being equipped with plural kinds of read/write units reading/writing data signals corresponding to respective plural kinds of cartridge memories and a control unit selecting a read/write unit corresponding to kinds of cartridge memories built in a magnetic tape cartridge out of the plural kinds of read/write units.

The another cartridge memory read/write device of the invention enables, in writing data signals in a cartridge memory, one cartridge memory read/write device to handle the plural kinds of cartridge memories by selecting a read/write unit corresponding to the kinds of cartridge memories built in the magnetic tape cartridge out of the plural kinds of read/write units. Accordingly, because a change to a cartridge memory read/write device corresponding to the kinds of cartridge memories is not needed each time, the productivity can be improved.

Still another cartridge memory read/write device of the invention is, in the same configuration of the firstly and secondary described devices, is characterized in that the control unit selects a read/write unit based on a command input from outside.

According to the still another cartridge memory read/write device of the invention, the control unit is composed so as to select a read/write unit based on a command input from outside. Therefore, in the case of kind of cartridge memory being identified, because only a read/write unit corresponding to the cartridge memory can be selected, it is not necessary to try to read default data written in the cartridge memory. As a result, the productivity can be further improved.

DESCRIPTION OF THE PREFERRED EMBODIMENTS

Hereinafter, one of embodiments of a cartridge memory read/write device related to the present invention will be described in detail, referring to drawings as needed. In the embodiment, a case in which the cartridge memory read/write device is installed at a tape winder is described.

Firstly, a configuration of a tape winder at which the cartridge memory read/write device (hereinafter referred to as "CM read/write device") is described referring to FIG. 1.

Figure 1:
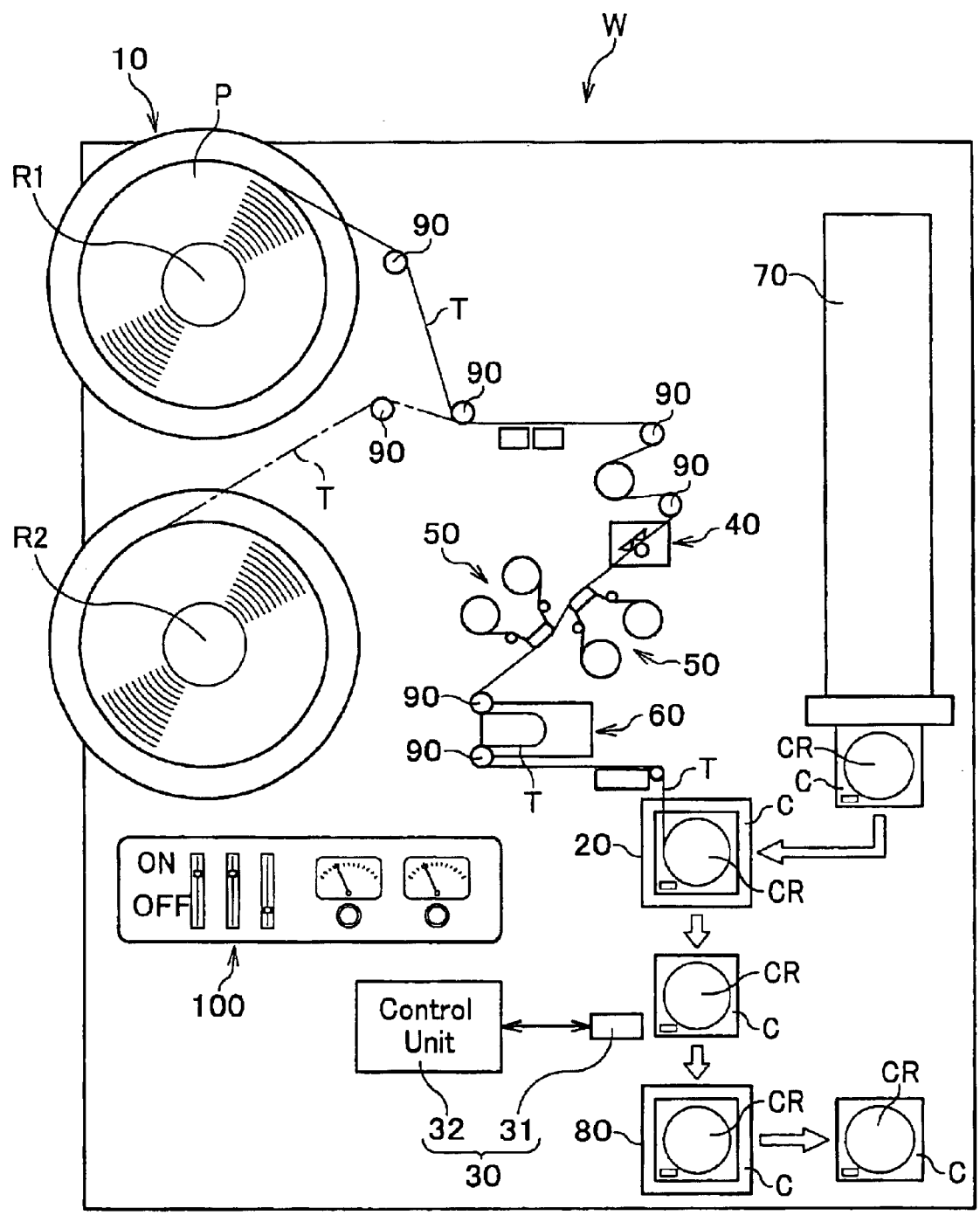
FIG. 1 is a front view showing a tape winder at which a CM (cartridge memory) read/write device is installed.

A tape winder W shown in FIG. 1 is equipment to wind so called a pancake-form magnetic tape T on a tape reel CR built in a magnetic tape cartridge C after cutting the magnetic tape T at a predetermined length. In addition, the tape winder W is the equipment to write manufacture/management information and the like in a cartridge memory CM (see FIG. 2) built in the tape winder W.

As shown in FIG. 1, the tape winder W is mainly equipped with a tape supplying device 10, a tape winding device 20, a CM read/write device 30, a blade device 40 polishing a surface of a magnetic tape T, cleaning devices 50 cleaning both surfaces of the magnetic tape T, a tension adjusting device 60 adjusting tension of the tape T in running, a magnetic tape cartridge supplying unit 70 supplying the tape winding device 20 with a stocked magnetic tape cartridge C and a magnetic tape cartridge discharging unit 80 discharging a magnetic tape cartridge C in which the tape T is wound on a tape reel CR and manufacture/management information and the like are written. Moreover, a plurality of tape guides 90 are arranged at adequate places to guide the tape T till the tape winding device 20. In addition, a number 100 in the drawing is an operation panel to operate the tape winder W.

The tape supplying device 10 is the device to supply the tape winding device 20 with the magnetic tape T and has reels R1 and R2 on which the pancake-form magnetic tape T is each wound. The supplying device 10 rotates the reel R1 (or reel R2) at a predetermined rotation number by a reel driving device not shown in the drawing and sends out the tape T toward the tape winding device 20. Meanwhile, because the tape supplying device 10 has the two reels R1 and R2, it is designed to continuously supply the tape winding device 20 with the tape T by changing to the reel R2 when the tape T on one reel R1 becomes vacant.

The tape winding device 20 is the device to wind the tape T supplied from the tape supplying device 10 on the tape reel CR of the magnetic tape cartridge C. The winding device 20 firstly cuts the tape T supplied from the supplying device 10 at a predetermined length by a cutting means not shown in the drawing. Then, the winding device 20 rotates the tape reel CR of the magnetic tape cartridge C at a predetermined rotation number by the reel driving device not shown in the drawing and winds the tape T cut at the predetermined length.

Figure 2:
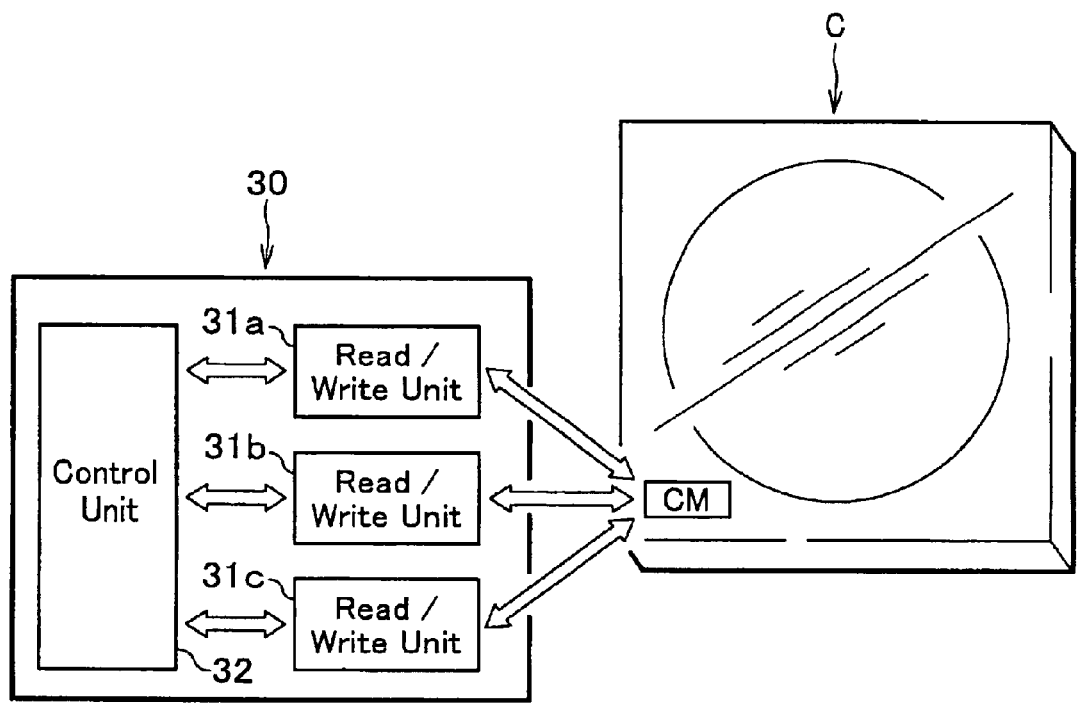
FIG. 2 is a configuration drawing showing a CM read/write device.

The CM read/write device 30 is the device to write the manufacture/management information and the like in the cartridge memory CM built in the magnetic tape cartridge C and is arranged between the winding device 20 and magnetic tape cartridge discharging unit 80. The CM read/write device 30 has, as shown in FIG. 2, three kinds of read/write units 31a, 31b, and 31c and a control unit 32. The read/write units 31a, 31b, and 31c can read and write data signals of the cartridge memory CM corresponding to different kinds of cartridge memories, respectively. In addition, the control unit 32 selects the read/write unit 31a, 31b, or 31c corresponding to the cartridge memory CM built in the magnetic tape cartridge C and controls so as to write the manufacture information and the like.

Next, operation of the CM read/write device 30 in the tape winder W thus composed is described referring to FIG. 2.

Firstly, the control unit 32 of the CM read/write device 30 tries to read default data written in the cartridge memory CM built in the magnetic tape cartridge C by an arbitrary CM read/write unit 31, for example, the read/write unit 31a. Then, if the default data can be read out of the cartridge memory CM, the read/write unit 31a which tried to read turns out to correspond to it. In the case, the control unit 32 controls to write the manufacture/management information and the like in the cartridge memory CM. On the contrary, if the default data cannot be read out of the cartridge memory CM, the read/write unit 31a which tried to read turns out not to correspond to it. Meanwhile, in the cartridge memory CM, the default data such as a serial number, manufacture information, and the like are written in advance.

Next, if the default data cannot be read out of the cartridge memory CM by the read/write unit 31a, try to read the default data written in the cartridge memory CM built in the magnetic tape cartridge C by the read/write unit 31b different from the last time. Then, if the default data can be read out of the cartridge memory CM, the read/write unit 31b which tried to read turns out to correspond to it. In the case, the control unit 32 controls to write the manufacture/management information and the like in the cartridge memory CM. On the contrary, if the default data cannot be read out of the cartridge memory CM, the read/write unit 31b which tried to read turns out not to correspond to it.

Next, if the default data cannot be read out of the cartridge memory CM by the read/write unit 31b, try to read the default data written in the cartridge memory CM built in the magnetic tape cartridge C by the remaining read/write unit 31c. Then, if the default data can be read out of the cartridge memory CM, the read/write unit 31c which tried to read turns out to correspond to it. In the case, the control unit 32 controls to write the manufacture/management information and the like in the cartridge memory CM. On the contrary, if the default data cannot be read out of the cartridge memory CM, the read/write unit 31c which tried to read turns out not to correspond to it.

Thus, firstly try to read the default data written in the cartridge memory CM by each data signal read/write unit 31a through 31c and write the manufacture/management information and the like in the cartridge memory CM by the read/write unit 31 which can read the default data out of the cartridge memory CM, thereby being able to handle plural kinds of cartridge memories by one cartridge memory read/write device. Accordingly, because a change to a cartridge memory read/write device corresponding to the kinds of cartridge memories is not needed each time, the productivity can be improved.

Thus, although one of embodiments of the present invention is described, the invention is not limited to such the embodiment and various variations are available as far as they are based on the technical ideas of the invention.

For example, in the embodiment, although the control unit 32 controls which to use by firstly trying to read the default data in order to select the read/write unit 31, the invention can compose so as to select a read/write unit based on a command input from outside. Thus, in the case of kind of cartridge memory being identified, because only a read/write unit corresponding to the cartridge memory can be selected, it is not necessary to try to read the default data written in the cartridge memory. As a result, the productivity can be further improved.

Moreover, although in the embodiment the CM read/write device 30 is provided in the tape winder W, in the present invention it may not be provided in the tape winder W and can also be made to function as an independent CM read/ write device. Thus, the invention is available not only for a form of writing data signals in a cartridge memory in a tape winder but also for another form of writing management information and the like after a final process in which a magnetic tape cartridge is assembled. To be more precise, wind a magnetic tape on a tape reel before the tape reel is built in the magnetic tape cartridge in the tape winder, record manufacture/management information and the like of the wound magnetic tape, call up the recorded manufacture/management information and the like, and write in the cartridge memory. In the case, if in the final process different kinds of cartridge memories are built in, data signals can be written in the cartridge memories by one CM read/write device.

Moreover, in the embodiment, although three kinds of read/write units are provided, the invention is not limited to this and if more than one kind, any kinds are available. By increasing read/write units, it is possible to handle more kinds of cartridge memories.

Still moreover, in the embodiment, although a magnetic tape is used as a recording medium, an optical recording tape is also available.

What is claimed is:

1. A cartridge memory read/write device used in a production line on which plural kinds of cartridge memories flow, the device comprising:

plural kinds of read/write units reading and writing data signals corresponding to respective kinds of plural kinds of cartridge memories; and a control unit selecting a read/write unit corresponding to kinds of said cartridge memories which flow on said production line out of said plural kinds of read/write units.

2. A cartridge memory read/write device according to claim 1, wherein when data signals are written in a cartridge memory, default data of said cartridge memory is tried to be read with said plural kinds of read/write units; and wherein a read/write unit which can read said default data is selected.

3. A cartridge memory read/write device according to claim 2, wherein when data signals are written in a cartridge memory, default data of said cartridge memory is tried to be read with said read/write unit; and wherein when said default data cannot be read, said default data of said cartridge memory is tried to be read with other read/write units.

4. A cartridge memory read/write device according to claim 1, wherein when data signals are written in a cartridge memory, default data of said cartridge memory is tried to be read with said read/write unit; and wherein when said default data cannot be read, said default data of said cartridge memory is tried to be read with other read/write units.

5. A cartridge memory read/write device according to claim 1, wherein said control unit selects said read/write unit based on a command input from outside.

6. A cartridge memory read/write device used in a tape winder winding a tape on a tape reel of a tape cartridge, the device comprising:

plural kinds of read/write units reading and writing data signals corresponding to respective kinds of plural kinds of cartridge memories; and a control unit selecting a read/write unit corresponding to kinds of said cartridge memories built in said tape cartridge out of said plural kinds of read/write units.

7. A cartridge memory read/write device according to claim 6, wherein when data signals are written in a cartridge memory, default data of said cartridge memory is tried to be read with said plural kinds of read/write units; and wherein a read/write unit which can read said default data is selected.

8. A cartridge memory read/write device according to claim 7, wherein when data signals are written in a cartridge memory, default data of said cartridge memory is tried to be read with said read/write unit; and wherein when said default data cannot be read, said default data of said cartridge memory is tried to be read with other read/write units.

9. A cartridge memory read/write device according to claim 8, wherein said tape is a magnetic tape.

10. A cartridge memory read/write device according to claim 8, wherein said tape is an optical recording tape.

11. A cartridge memory read/write device according to claim 7, wherein said tape is an optical recording tape.

12. A cartridge memory read/write device according to claim 7, wherein said tape is a magnetic tape.

13. A cartridge memory read/write device according to claim 6, wherein when data signals are written in a cartridge memory, default data of said cartridge memory is tried to be read with said read/write unit; and wherein when said default data cannot be read, said default data of said cartridge memory is tried to be read with other read/write units.

14. A cartridge memory read/write device according to claim 13, wherein said tape is a magnetic tape.

15. A cartridge memory read/write device according to claim 13, wherein said tape is an optical recording tape.

16. A cartridge memory read/write device according to claim 6, wherein said control unit selects said read/write unit based on a command input from outside.

17. A cartridge memory read/write device according to claim 16, wherein said tape is a magnetic tape.

18. A cartridge memory read/write device according to claim 16, wherein said tape is an optical recording tape.

19. A cartridge memory read/write device according to claim 6, wherein said tape is a magnetic tape.

20. A cartridge memory read/write device according to claim 6, wherein said tape is an optical recording tape.

* * * * *